(12) United States Patent
Tanaka et al.

(10) Patent No.: US 6,944,480 B2
(45) Date of Patent: Sep. 13, 2005

(54) WIRELESS DISPLAY SYSTEM, METHOD AND COMPUTER PROGRAM MEDIA THEREFOR

(75) Inventors: Atsushi Tanaka, Osaka (JP); Osamu Kamo, Kobe (JP); Masaki Mukai, Nishinomiya (JP); Osamu Sameshima, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 688 days.

(21) Appl. No.: 09/843,032

(22) Filed: Apr. 27, 2001

(65) Prior Publication Data

US 2002/0193149 A1 Dec. 19, 2002

(51) Int. Cl.[7] .................................................. H04Q 7/32
(52) U.S. Cl. ..................... 455/566; 455/556.1; 455/557; 455/574; 455/343.1; 455/41.1; 455/41.2; 455/550.01; 345/158; 345/169; 345/1.2; 345/2.3
(58) Field of Search .............................. 455/566, 500, 455/423, 424, 425, 426.1, 426.2, 454, 41.1, 41.2, 41.3, 61.1, 343.1–343.6, 445, 571, 90.1, 556.1, 556.2, 557, 550.1, 572, 574, 575.1, 344, 403, 422.1, 517, 90.3; 345/344, 619, 672, 676, 158, 169, 1.2, 2.3; 340/539

(56) References Cited

U.S. PATENT DOCUMENTS 6,278,887 B1 * 8/2001 Son et al. .................... 455/566
6,311,042 B1 * 10/2001 DeSchrijver ............... 455/66.1
6,411,808 B1 * 6/2002 Adachi et al. .............. 455/434
6,571,111 B1 * 5/2003 Mayo et al. ................. 455/574
6,694,356 B1 * 2/2004 Philyaw ....................... 709/217
2001/0027098 A1 * 10/2001 Suzuki ........................ 455/415
2002/0077067 A1 * 6/2002 Lochner et al. ............... 455/73

FOREIGN PATENT DOCUMENTS

JP        2001-69141        3/2001

* cited by examiner

Primary Examiner—Keith Ferguson
(74) Attorney, Agent, or Firm—McDermott Will & Emery LLP (57) ABSTRACT

An image display device has a serial port as data input and output port for the system, and input and output data converting element for mutually converting the data format of input and output data for wireless communication. A data processing device has input and output processing virtual element for processing data input and output virtually as if the data input and output port are connected directly. The input data of the serial port is converted by the input and output converting element, and is transmitted to the data processing device through a wireless unit, and is processed through the input and output processing virtual element. The output data of the data processing device is transmitted to the image display device in the wireless unit by way of the input and output processing virtual element, and is converted by the input and output data converting element, and is issued to the serial port. At this time, depending on whether the serial port is being used or not, the control level of power saving operation is changed. In this configuration, the input and output peripheral device can be used at the display side, and power saving control in harmony between display function and input and output peripheral device function is realized.

32 Claims, 9 Drawing Sheets

WIRELESS DISPLAY SYSTEM, METHOD AND COMPUTER PROGRAM MEDIA THEREFOR

BACKGROUND OF THE INVENTION

1. Field of the Invention

The present invention relates to a wireless display system for wireless connection of display and main body of a personal computer (PC) so that the display unit may be portable.

2. Description of the Related Art

Hitherto, when using input and output peripheral devices for PC (for example, barcode reader, tester, GPS) in a wireless display system, it is required to use a peripheral device built in the main body of data processing apparatus such as PC, or an external device connected to the general-purpose interface of the PC main body.

Or as disclosed in Japanese Laid-open Patent No. 2001-69141, by using a device for replacing the cable of the input and output peripheral device with wireless connection, the input and output peripheral device of wireless connection can be used together with the wireless display system.

In the case of the former prior art, the display and the PC must be carried at the same time. In the wireless display system, the PC can be operated by carrying the display only, or the anti-shock capability is high because only the display having no mechanical parts is carried, but such merits are sacrificed in this case. In the latter prior art, as compared with the former, the portable device is lighter in weight and anti-shock capability is higher, but plural devices must be carried, and it is not convenient. In power saving function and others, related device control between the wireless display system and input and output peripheral device cannot be expected. The sequence of user authentication and connection verification is complicated. Hence, the system is not easy to use for the user.

SUMMARY OF THE INVENTION

The invention is devised in the light of the above problems.

A wireless display system of the invention comprises data input and output means for input and output of data in and from an image display device, input and output data converting means for converting data format and protocol in wireless communication means, and input and output processing virtual means for making virtual data input and output process in a data processing device as if the data input and output means were connected directly. The data input and output means and input and output converting means are provided in the image display device, and the input and output processing virtual means is provided at the data processing device side. Communication is made between the image display device and data processing device, and all data about data input and output are mutually transmitted and received through the input and output data converting means and input and output processing virtual means.

A method of communication of wireless display system of the invention comprises the steps of:

(a) entering and producing data in and from an image display device, (b) converting data format and protocol in wireless communication, and (c) processing input and output in a data processing device virtually as if data input and output processing were done directly.

Step (a) and step (b) are done at the image display device side, and step (c) is done at the data processing device side.

All data relating to data input and output communicated between the image display device and data processing device is processed at step (b) and step(c), and is mutually transmitted and received.

A computer program recording medium for executing communications of wireless display system of the invention includes the programs for:

(a) entering and producing data in and from an image display device, (b) converting data format and protocol in wireless communication, and (c) processing input and output in a data processing device virtually as if data input and output processing were done directly.

Program (a) and program (b) are executed at the image display device side, and program (c) is executed at the data processing device side. All data relating to data input and output communicated between the image display device and data processing device is transmitted and received by execution of program (b) and program (c).

DETAILED DESCRIPTION OF THE EXEMPLARY EMBODIMENTS

Embodiments of the invention are described below while referring to FIG. 1 to FIG. 11.

(Embodiment 1)

Figure 1:
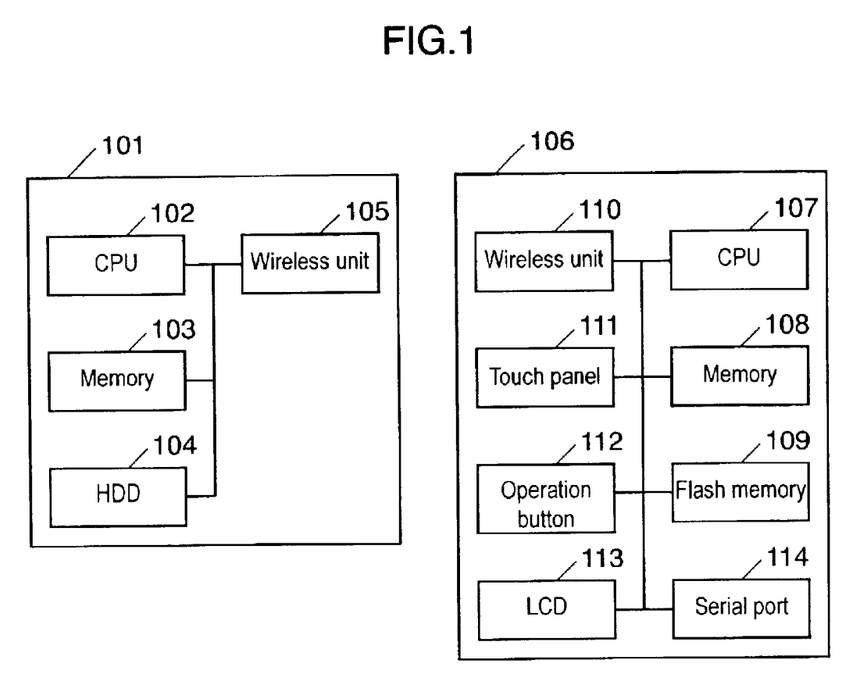
FIG. 1 is a block diagram showing a configuration of wireless display system of embodiment 1 of the invention.

FIG. 1 is a block diagram showing a configuration of wireless display system of embodiment 1 of the invention.

FIG. 1 shows a data processing device 101 and an image display device 106. A CPU 102 is processing means of the data processing device 101. A memory 103 and an HDD 104 are both storing means of the data processing device 101. The memory 103 temporarily stores the code and processing data to be processed in the CPU 102, and the HDD 104 stores results of processing and other data for a long period. A wireless unit 105 is wireless communication means of the data processing device 101, and wireless communications are made with the image display device 106. In this embodiment, the technology of, for example, IEEE802.11 can be employed in wireless communications.

A CPU 107 is processing means of the image display device 106. A memory 108 and a flash memory 109 are both storing means of the image display device 106. The memory 108 temporarily stores the code and processing data to be processed in the CPU 107, and the flash memory 109 stores results of processing and other data for a long period. A wireless unit 110 is wireless communication means of the image display device 106, and wireless communications are made with the data processing device 101.

A touch panel 111 and an operation button 112 are both operating means of the image display device 106. The touch panel 111 is mainly responsible for input of operation depending on coordinates, among various operations of the PC. The operation button 112 is used for operation input for fixing and establishing the input, or calling of original function incorporated in the image display device. An LCD 113 is display means of the image display device 106, and it receives and displays the image transmitted by the data processing device 101 through wireless communication, or displays the image created by the image display device 106 itself. A serial port 114 is data input and output means of the image display device 106, and data is exchanged with a serial device connected to the port. In this embodiment, for example, the technology conforming to RS-232-C may be employed in serial communication.

In the embodiment of the invention, the input and output processing virtual means is realized by a program stored in the memory 103 of the data processing device 101 and executed by the CPU 102. For example, when the code to be executed by the CPU 102 of the data processing device 101 is composed of an operating system, and an application running on the operating system, the input and output processing virtual means is realized by a driver or resident application conforming to the specification of the operating system. The input and output processing virtual means operates when the general application requests serial communication process to the operating system. That is, the instruction for data output to the serial port or state change conforming to the specification of the operating system is converted into data format and protocol of wireless communication. In consequence, the data and protocol of wireless communication format are converted to the notice of data input from serial port or state change conforming to the specification of the operating system. In this way, the input and output processing virtual means processes input and output virtually. In this embodiment, the technology of TCP/IP protocol may be employed for data format and protocol of wireless communication.

The input and output data converting means and power saving control means are realized by programs stored in the memory 108 of the image display device 106, and executed by the CPU 107. By input and output data converting means, the input data and state change information of the serial port 114 are converted into the data format and protocol of wireless communication, and the data and protocol of wireless communication format received in the wireless unit 110 are converted into the output data and state change instruction of the serial port 114. The power saving control means can change the power saving setting and control on/off switching of power supply of the CPU 107, wireless unit 110, touch panel 111, and LCD 113 individually.

After completion of wireless communication connection between the data processing device 101 and image display device 106, if there is any data input from the serial port 114 or state change such as signal wire change of serial port 114, the image display device 106 converts the serial data and signal wire change to the data format and protocol of wireless communication by the program on the CPU 107, and transmits to the data processing device 101 from the wireless unit 110. The data processing device 101 receives the transmitted input data of wireless communication format in the wireless unit 105. The input data is, by the CPU 102, returned from the data and protocol of wireless communication format to the original serial data and code showing the state change such as signal wire change by the input and output processing virtual program, and is handled by other program on the CPU 102. As a result, the serial input through wireless communication can be processed similarly with the serial input from the serial port incorporated in the data processing device 101.

In the case the processing result of serial input brings about a change on the display screen, the CPU 102 of the data processing device 101 creates display screen image data on the basis of the serial input data processing result. The CPU 102 transmits the differential portion or whole of screen image from the wireless unit 105 to the image display device 106. The image display device 106 displays the transmitted display screen image data in the LCD 113.

After completion of wireless communication connection between the data processing device 101 and image display device 106, if there is output data to the serial port 114 or state change instruction such as signal wire change of serial port 114, by various programs operating on the CPU 102 of the data processing device 101, the data processing device 101 starts output processing same as the serial data from the incorporated serial port. Its output processing is done through the input and output virtual program on the CPU 102. As a result, the serial output data and state change instruction such as signal wire change are converted to the data format and protocol of wireless communication, and transmitted to the image display device 106 from the wireless unit 105. The image display device 106 receives the transmitted serial output data and state change instruction such as serial signal wire change being converted to the data format and protocol of wireless communication, in the wireless unit 105. The input and output data conversion program on the CPU 107 returns the data and protocol of wireless communication format to the original serial output data and state change instruction such as serial signal wire change, and executes output to the serial port 114 or state change such as signal wire change.

As a result of transmission of serial output data, if the display screen is changed, the CPU 102 of the data processing device 101 creates display screen image data on the basis of the serial output data processing result, and transmits the differential portion or whole of screen image from the wireless unit 105 to the image display device 106. The image display device 106 displays the transmitted display screen image data in the LCD 113.

Figure 2:
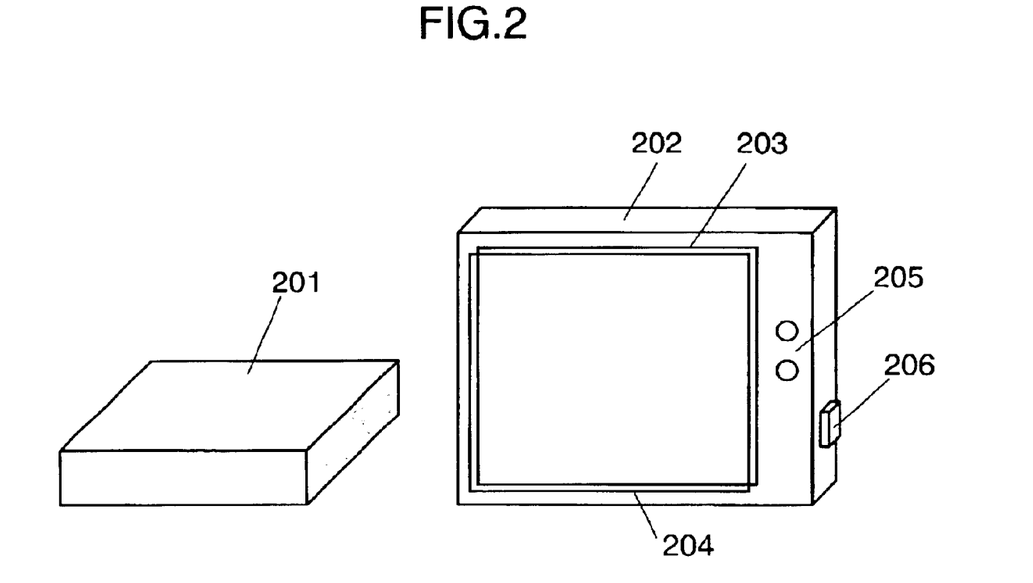
FIG. 2 shows an appearance of wireless display system of embodiment 1 of the invention.

FIG. 2 shows an appearance of the wireless display system in embodiment 1 of the invention.

In FIG. 2, a PC main body 201 corresponds to the data processing device 101, and a display 202, to the image display device 106. Further, an LCD panel 203 is display means, a touch panel 204 and an operation button 205 are input means, and a serial port connector 206 is data input and output means.

Figure 3:
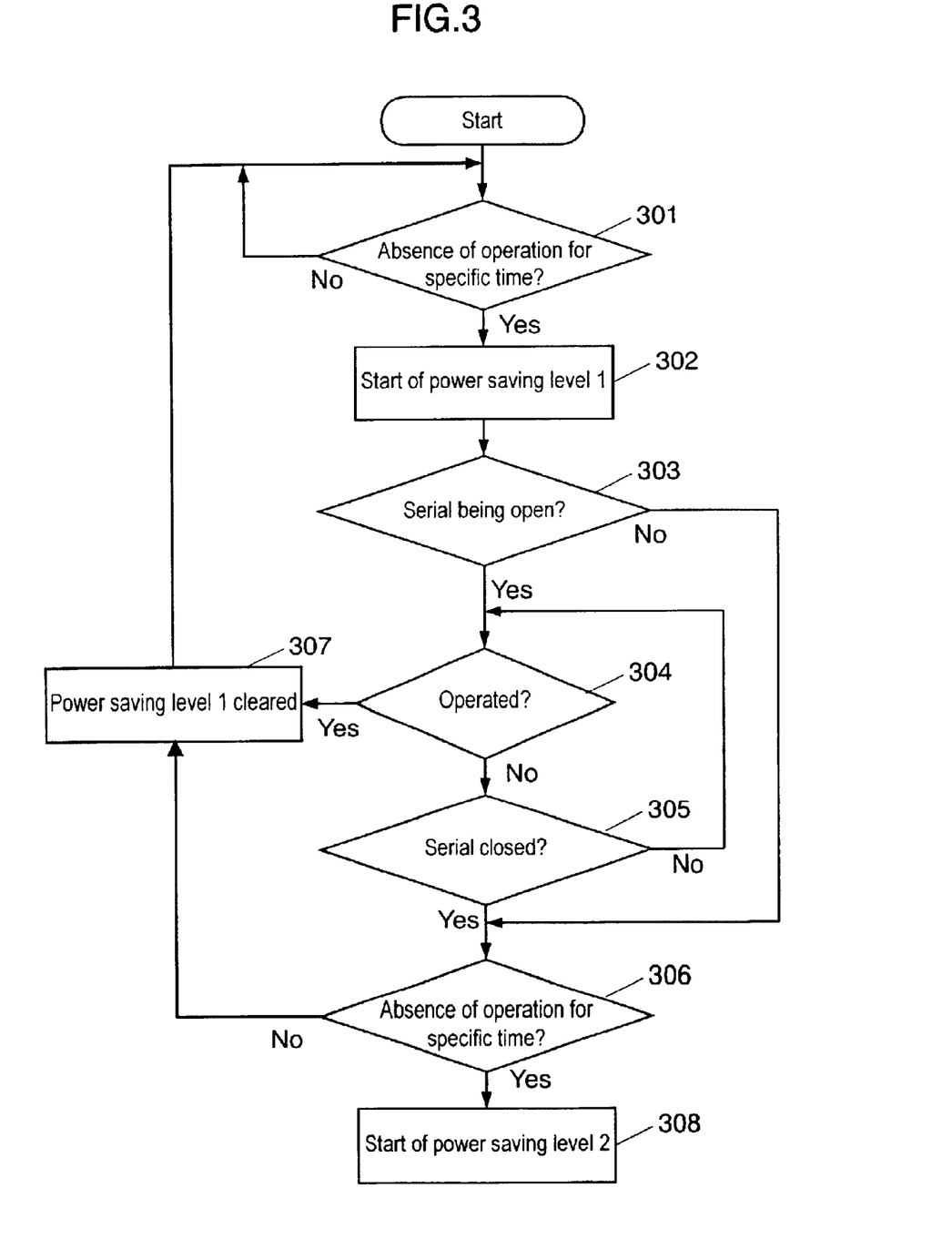
FIG. 3 is a flowchart showing power saving process in wireless display system of embodiment 1 of the invention.

FIG. 3 is a flowchart showing power saving process at the image display device side of the wireless display system in embodiment 1 of the invention.

After starting the image display device 106 of the wireless display system, at step 301, a wait time timer is set to wait for operation by the user for a specific time (for example, 2 minutes). If operated within 2 minutes, the wait time timer is reset to continue to wait for operation at step 301. If not operated, at step 302, power saving state of first level starts. At step 302, as power saving state of first level, power supply to the LCD 113 is stopped by power saving control means, and access to the touch panel 111 is stopped. At next step 303, checking if the serial port 114 is presently usable (open) or not, it is verified if possible to transfer to power saving state of second level or not. While the serial port 114 is open, it means the communication is being made, and the process goes to step 304 to continue power saving state of first level, and if not open, the process goes to step 306 to wait for start of power saving state of second level. At step 304, checking if the operation button 112 has been operated by the user or not, and if operated, the process goes to step 307 for canceling the power saving state, and if not operated, the process goes to step 305. At step 305, checking if the serial port 114 is in non-usable (closed) state or not, it is verified whether possible or not to transfer to the power saving state of second level. If the serial port 114 is not closed, it means the communication is being made, and the process goes to step 304 to continue power saving state of first level, and if already closed, the process goes to step 306 to wait for start of power saving state of second level. Step 306 is to wait for operation by the user on the operation button 112 until lapse of a specific time (for example, 5 minutes) of the wait time timer set at step 301. If operated within 5 minutes, the process goes to step 307, and if not operated, the process goes to step 308 to transfer to power saving state of second level. At step 307, power supply to the LCD 113 is resumed to light up by the power saving control means. By resuming access to the touch panel 111, the power saving state of first level is canceled, the wait time timer is reset, and the process returns to step 301. At step 308, as the power saving state of second level, the power source of the image display device 106 is turned off, or, by lowering the power consumption of the parts, the power saving control including the remaining processing means and wireless communication means is started.

Figure 4:
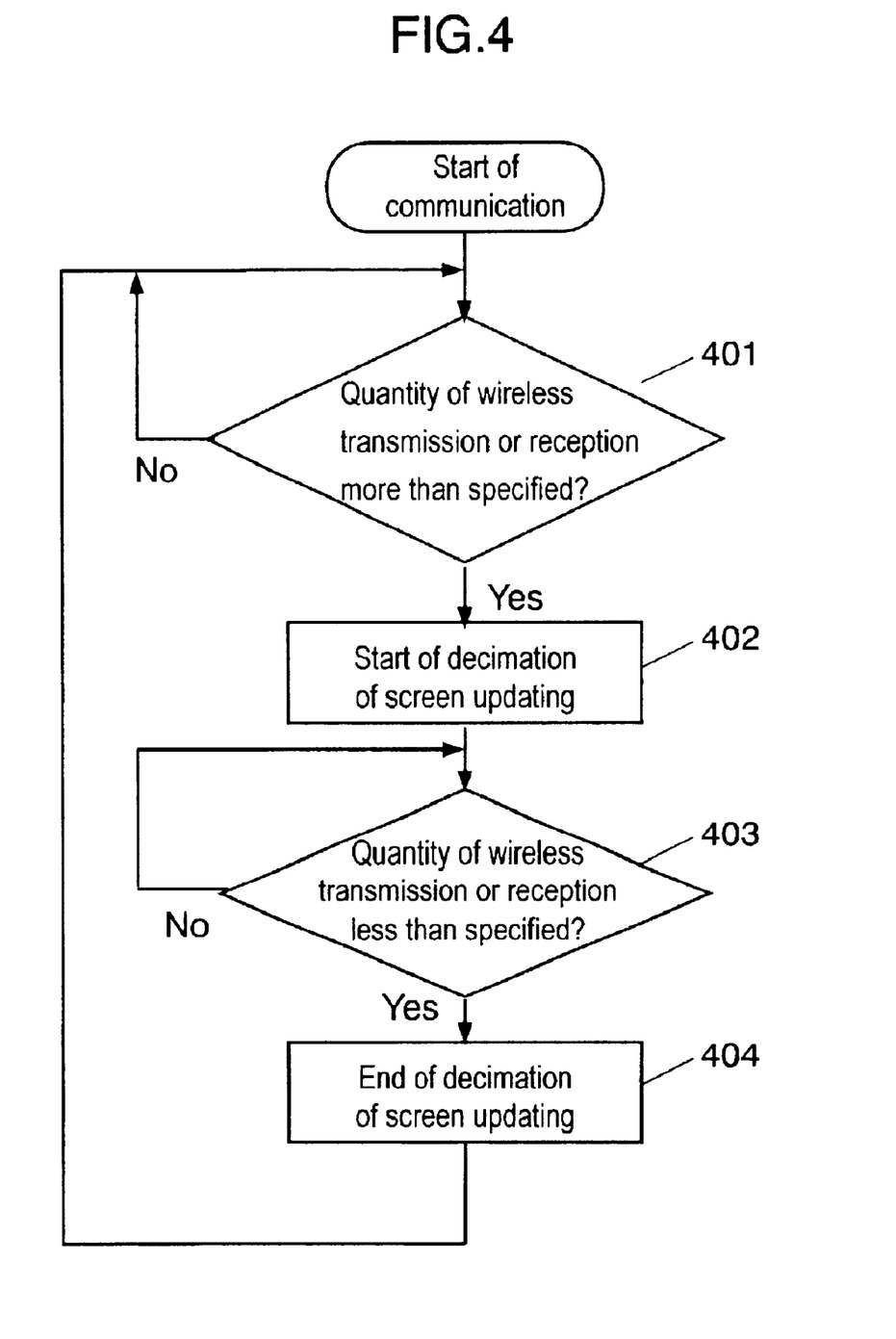
FIG. 4 is a flowchart showing wireless communication process in wireless display system of embodiment 1 of the invention.

FIG. 4 is a flowchart showing wireless communication process of the wireless display system in embodiment 1 of the invention.

When wireless communication starts after completion of wireless connection between the data processing device 101 and image display device 106, the communication rate of the following data is measured at step 401. The data is the sum of all data of wireless communications, that is, the user's operation data entered through the touch panel 111 and operation button 112, the screen image data as a result of data processing by the data processing device 101 according to the user's operation and data input and output relating to the serial port 114, the input data from the serial port 114, and the output data to be issued by the data processing device 101 by using the serial port 114. When the communication rate of result of measurement exceeds a specific rate (for example, 75%) of the effective communication rate in the employed wireless communication system, updating of the screen image data is decimated at a specific interval at step 402. For example, by setting the updating rate to about half of usual, the rate of communication data of wireless communication is lowered. As far as the communication rate measured at step 401 does not exceed a specific rate of the effective communication rate, the communication continues. At step 403, as a result of decimation of screen updating, if the communication rate of all data becomes lower than a specific rate (for example, 50%) of the effective communication rate of the employed wireless communication system, decimation of updating of screen image data is canceled at step 404, and communication continues.

(Embodiment 2)

Figure 5:
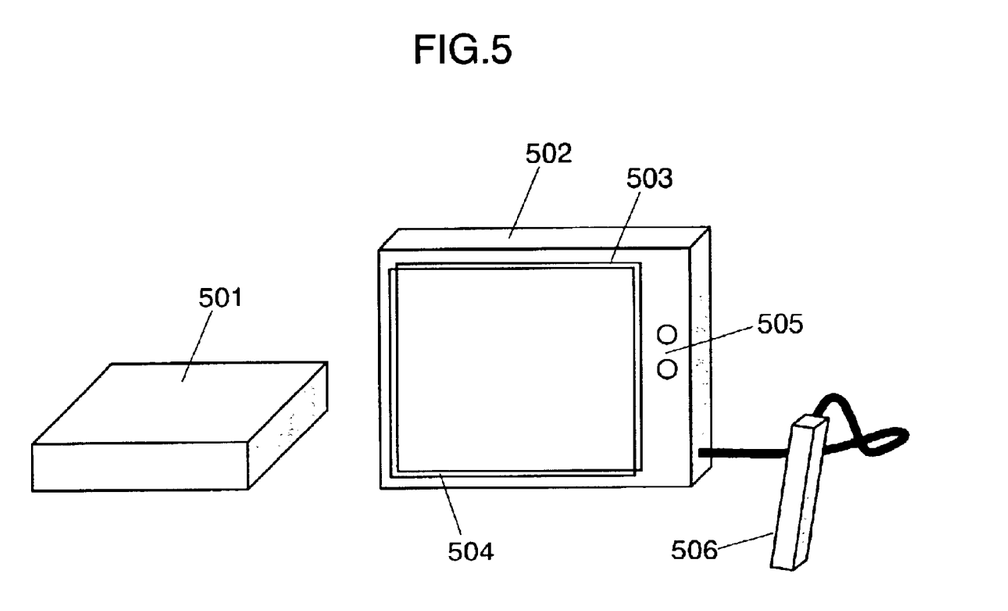
FIG. 5 shows an appearance of wireless display system of embodiment 2 of the invention.
Figure 6:
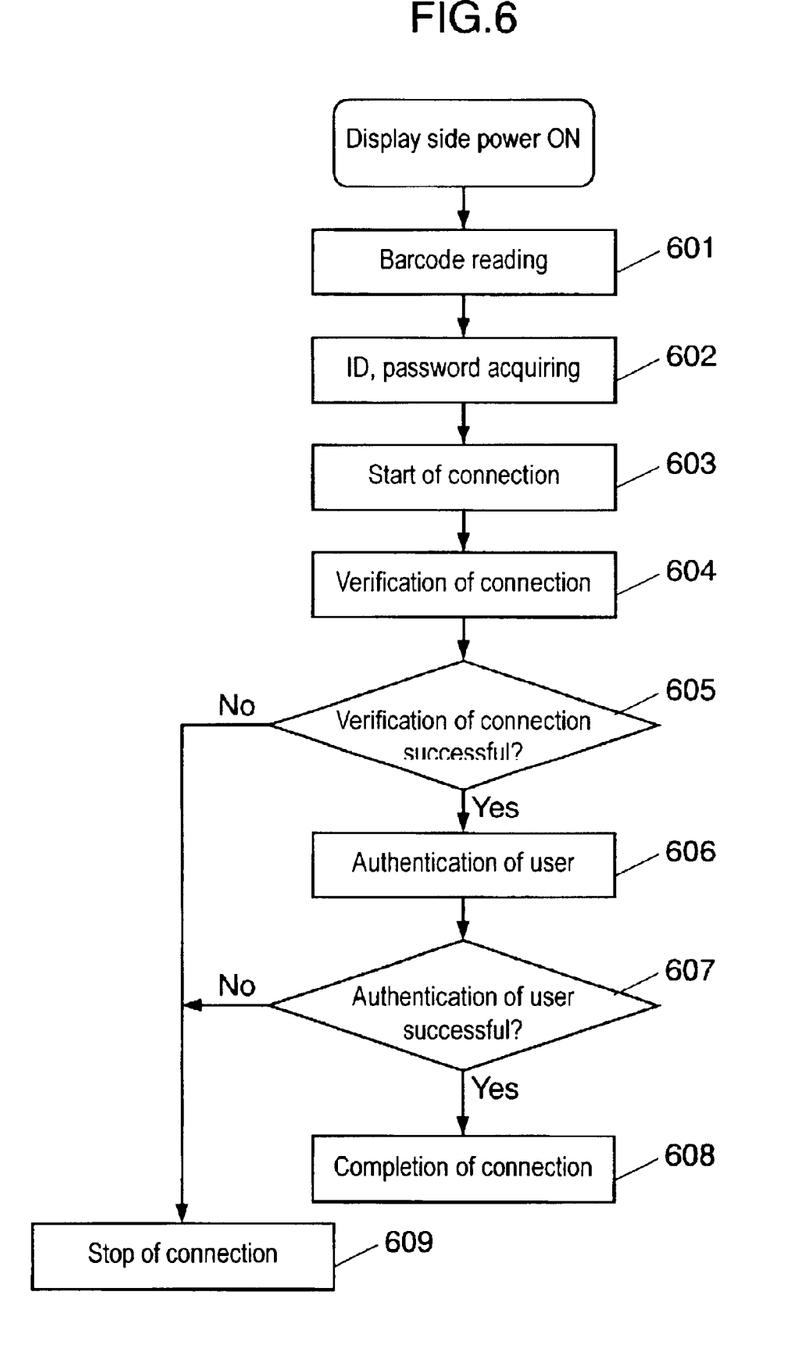
FIG. 6 is a flowchart showing verification process in wireless display system of embodiment 2 of the invention.

Embodiment 2 of the invention is explained by referring to FIG. 5 and FIG. 6.

Embodiment 2 differs from embodiment 1 in that a barcode reader incorporated or externally provided in the display of the wireless display is used as data input and output means. The other configuration, data input and output processing, power saving process, and wireless communication process are same as in embodiment 1, and duplicate explanation is omitted.

FIG. 5 shows an appearance of wireless display system of embodiment 2 of the invention.

In FIG. 5, a PC main body 501 corresponds to the data processing device, and a display 502, to the image display device. An LCD panel 503 is display means, a touch panel 504 and an operation button 505 are input means, and a barcode reader 506 is data input and output means. In FIG. 5, the barcode reader 506 is connected to the display 502 through a cable, but it may be also incorporated in the display 502.

FIG. 6 is a flowchart showing validation process in wireless display system of embodiment 2 of the invention.

After starting the PC main body 501, the power source of the display 502 is turned on, and the barcode reader 506 connected to the display 502 is started to set in barcode reading state. At step 601, the user, using the barcode reader 506, reads the barcode of the object printing the barcode for identifying the user such as the ID plate. At step 602, from the reading result, the password for verifying connection and the user ID and password for verifying the user are acquired.

In the embodiment, in order to acquire the password for verifying connection and the user ID and password for authenticating the user, a table for acquiring the password for verifying connection and the user ID and password for authenticating the user from the data being read by the barcode reader 506 is preliminarily stored in the storage means of the display 502. Aside from this method of referring to the table by the data of reading result, there is also a method of taking out the password for verifying connection and the user ID and password for authenticating the user contained in the reading result data directly from the reading result data.

When the password for verifying connection and the user ID and password for authenticating the user are acquired, at step 603, wireless connection process between the display 502 and PC main body 501 is started. Once wireless connection process is started, at step 604, wireless connection is verified by using the password for verification of wireless connection. For verification of wireless connection, a general verification method may be used, such as verification of coincidence of the acquired password for verification of wireless connection and password stored at the PC main body 501 side. At step 605, the verification result is confirmed, and if failing in verification of wireless connection, the wireless connection process is stopped at step 609. When succeeding in wireless connection verification, next, the user ID and password for user authentication are transmitted to the PC main body 501 by wireless communication, and the user is authenticated by the PC main body 501. If failing in user authentication at step 607, the wireless connection process is stopped at step 609. When succeeding in user authentication, at step 608, the operating environment of the PC main body 501 depending on the user ID is reproduced, and the wireless connection process is completed. After step 608, ordinary wireless communication is enabled.

(Embodiment 3)

Figure 7:
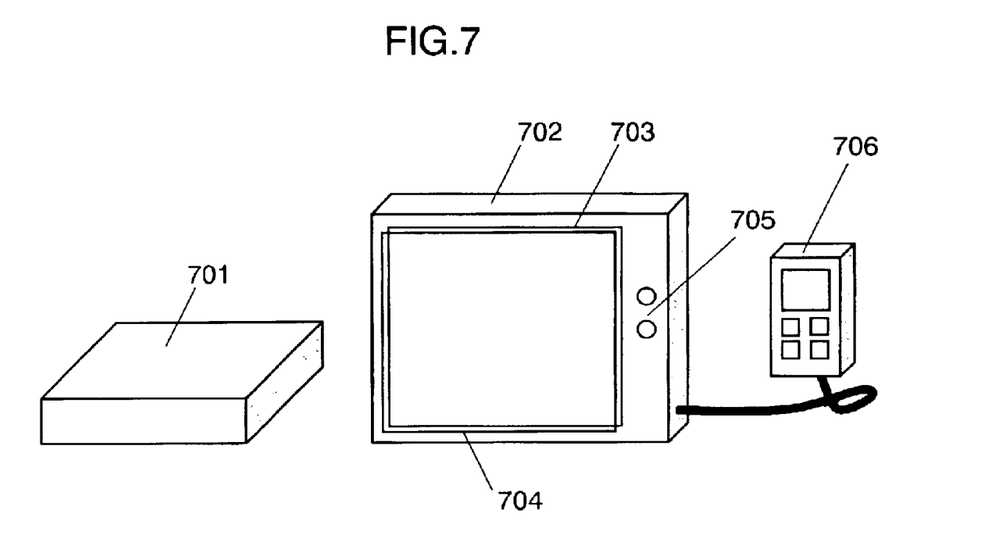
FIG. 7 shows an appearance of wireless display system of embodiment 3 of the invention.

Embodiment 3 of the invention is explained while referring to FIG. 7.

Embodiment 3 differs from embodiment 1 in that a tester incorporated or externally provided in the display of the wireless display is used as data input and output means. The other configuration, data input and output processing, power saving process, and wireless communication process are same as in embodiment 1, and duplicate explanation is omitted.

FIG. 7 shows an appearance of wireless display system of embodiment 3 of the invention.

In FIG. 7, a PC main body 701 corresponds to the data processing device, and a display 702, to the image display device. An LCD panel 703 is display means, a touch panel 704 and an operation button 705 are input means, and a tester 706 is data input and output means. In FIG. 7, the tester 706 is connected to the display 702 through a cable, but it may be also incorporated in the display 702.

(Embodiment 4)

Figure 8:
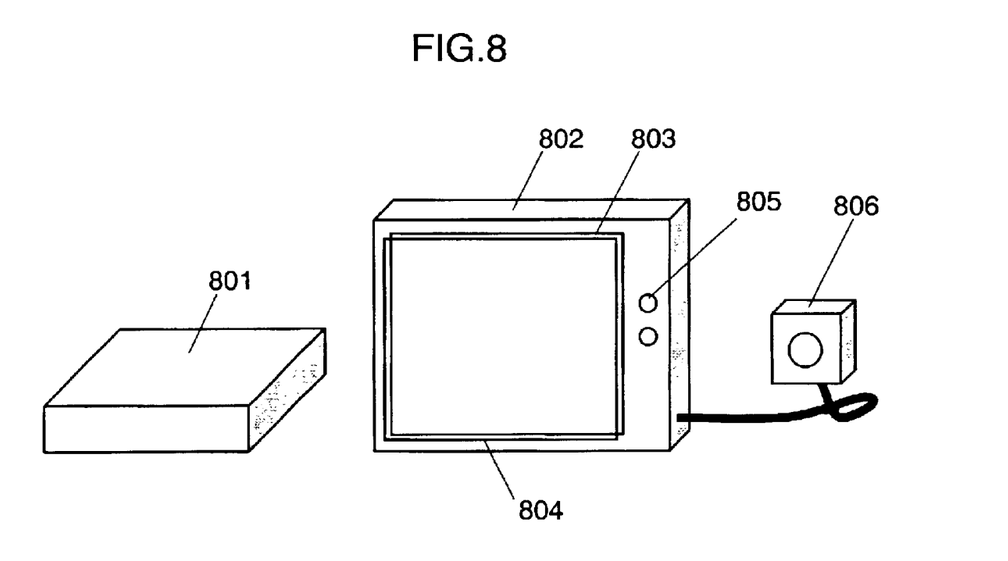
FIG. 8 shows an appearance of wireless display system of embodiment 4 of the invention.

Embodiment 4 of the invention is explained while referring to FIG. 8.

Embodiment 4 differs from embodiment 2 in that a digital camera incorporated or externally provided in the display of the wireless display is used as data input and output means. The other configuration, data input and output processing, power saving process, wireless communication process, and verification process are same as in embodiment 2, and duplicate explanation is omitted.

FIG. 8 shows an appearance of wireless display system of embodiment 4 of the invention.

In FIG. 8, a PC main body 801 corresponds to the data processing device, and a display 802, to the image display device. An LCD panel 803 is display means, a touch panel 804 and an operation button 805 are input means, and a digital camera 806 is data input and output means. In FIG. 8, the digital camera 806 is connected to the display 802 through a cable, but it may be also incorporated in the display 802.

(Embodiment 5)

Figure 9:
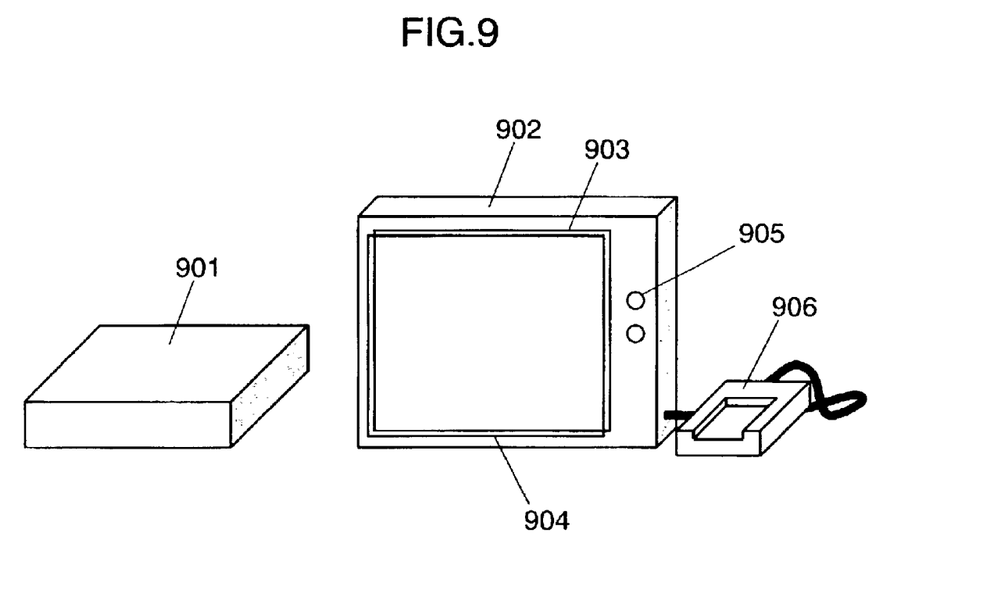
FIG. 9 shows an appearance of wireless display system of embodiment 5 of the invention.

Embodiment 5 of the invention is explained while referring to FIG. 9.

Embodiment 5 differs from embodiment 2 in that a card reader incorporated or externally provided in the display of the wireless display is used as data input and output means. The other configuration, data input and output processing, power saving process, wireless communication process, and verification process are same as in embodiment 2, and duplicate explanation is omitted.

FIG. 9 shows an appearance of wireless display system of embodiment 5 of the invention.

In FIG. 9, a PC main body 901 corresponds to the data processing device, and a display 902, to the image display device. An LCD panel 903 is display means, a touch panel 904 and an operation button 905 are input means, and a card reader 906 is data input and output means. In FIG. 9, the card reader 906 is connected to the display 902 through a cable, but it may be also incorporated in the display 902.

(Embodiment 6)

Figure 10:
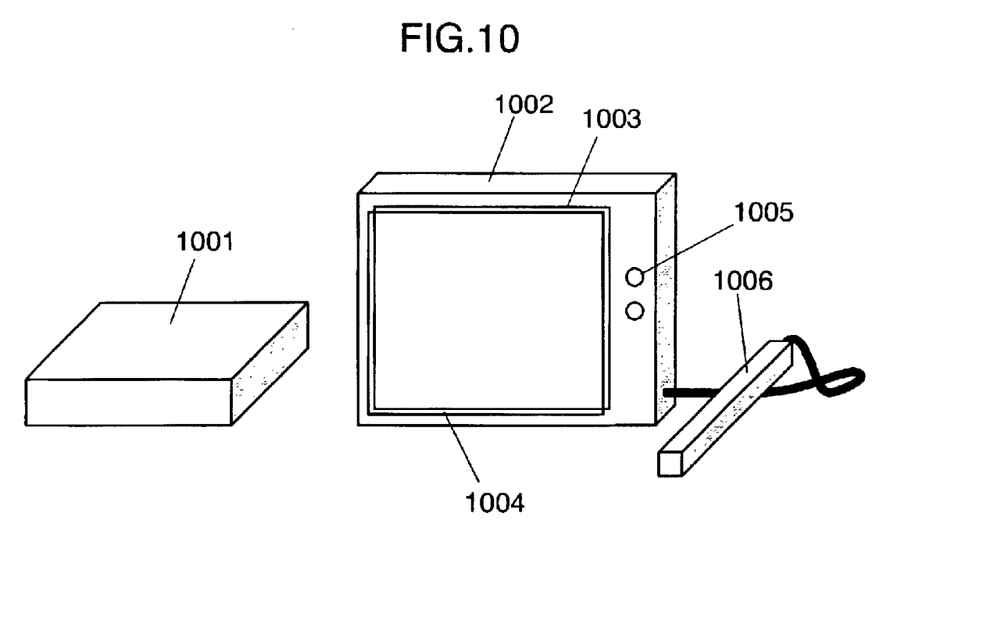
FIG. 10 shows an appearance of wireless display system of embodiment 6 of the invention.

Embodiment 6 of the invention is explained while referring to FIG. 10.

Embodiment 6 differs from embodiment 2 in that a scanner incorporated or externally provided in the display of the wireless display is used as data input and output means. The other configuration, data input and output processing, power saving process, wireless communication process, and verification process are same as in embodiment 2, and duplicate explanation is omitted.

FIG. 10 shows an appearance of wireless display system of embodiment 6 of the invention.

In FIG. 10, a PC main body 1001 corresponds to the data processing device, and a display 1002, to the image display device. An LCD panel 1003 is display means, a touch panel 1004 and an operation button 1005 are input means, and a scanner 1006 is data input and output means. In FIG. 10, the scanner 1006 is connected to the display 1002 through a cable, but it may be also incorporated in the display 1002.

(Embodiment 7)

Figure 11:
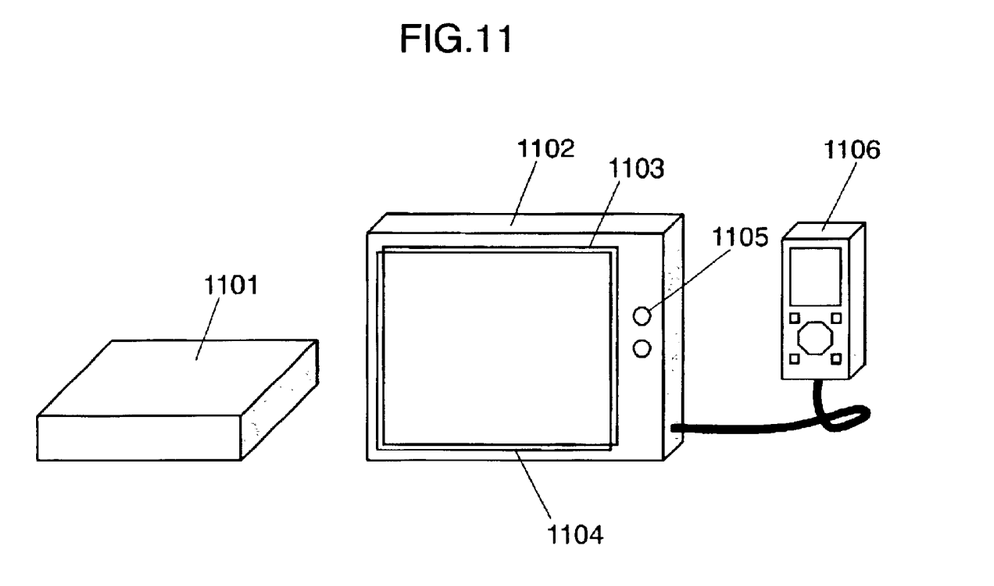
FIG. 11 shows an appearance of wireless display system of embodiment 7 of the invention.

Embodiment 7 of the invention is explained while referring to FIG. 11.

Embodiment 7 differs from embodiment 1 in that a GPS receiver incorporated or externally provided in the display of the wireless display is used as data input and output means. The other configuration, data input and output processing, power saving process, and wireless communication process are same as in embodiment 1, and duplicate explanation is omitted.

FIG. 11 shows an appearance of wireless display system of embodiment 7 of the invention.

In FIG. 11, a PC main body 1101 corresponds to the data processing device, and a display 1102, to the image display device. An LCD panel 1103 is display means, a touch panel 1104 and an operation button 1105 are input means, and a GPS receiver 1106 is data input and output means. In FIG. 11, the GPS receiver 1106 is connected to the display 1102 through a cable, but it may be also incorporated in the display 1102.

Herein, the wireless display system and its communication method of the invention are specifically described by referring to embodiments. According to the invention, the input and output peripheral devices can be used at the displays side of the wireless display. Further, the display function and the input and output peripheral device function cooperate, so that power saving control, easy connection, and verification sequence can be realized.

The program recording medium of the invention has recorded the program for the computer to execute this communication method.

What is claimed is:

1. A wireless display system including an image display device and a data processing device connected through wireless communication elements, said wireless display system comprising:

data input and output port for input and output of data to and from said image display device, input and output data converting elements for converting data format and protocol in said wireless communication elements, and input and output processing virtual elements for processing virtual data input and output in said data processing device as if the data input and output port are connected directly, wherein said data input and output port and input and output data converting elements are provided in said image display device, said input and output processing virtual elements is provided in said data processing device, all data, including input data and output data, communicated between said image display device and data processing device are mutually transmitted and received through said input and output data converting elements and input and output processing virtual elements, and if a data input or a signal indicating a state change is detected at the data input and output port, the input and output data converting elements are capable of converting the data input or the signal indicating the state change to a predetermined wireless communication data format and protocol.

2. The wireless display system of claim 1, wherein said image display device further comprises a power saving control device, and said power saving control device sets the image display device in a first power saving mode when the image display device is not operated for a specific time.

3. The wireless display system of claim 2, wherein said power saving control device sets the image display device in a second power saving mode for saving more power than in the first power saving mode when the image display device is in the first power saving mode, and the data input and output port are not used for a specific time.

4. The wireless display system of claim 3,
wherein said image display device further comprises display elements for displaying the image and operating elements to be operated by the user, and
said power saving control device sets said display elements and operating elements in the first power saving mode.

5. The wireless display system of claim 3,
wherein said wireless communication elements comprise elements for measuring the communication rate of all data including the image data transmitted from the data processing device and displayed in the image display device, and
the communication rate of the wireless communication is controlled by decimating the updating of the image data at specific intervals when the communication rate exceeds a certain rate of the effective communication rate of the wireless communication.

6. The wireless display system of claim 3,
wherein the data from said data input and output port is used for connection verification in wireless connection between the data processing device and image display device, or for user authentication in the data processing device.

7. The wireless display system of claim 3
wherein said data input and output port are a serial communication interface.

8. The wireless display system of claim 3,
wherein said data input and output port are at least one of barcode reader, tester, digital camera, card reader, scanner, and GPS.

9. The wireless display system of claim 2,
wherein said image display device further comprises display elements for displaying the image and operating elements to be operated by the user, and
said power saving control device sets said display elements and operating elements in the first power saving mode.

10. The wireless display system of claim 2,
wherein said wireless communication elements comprise elements for measuring the communication rate of all data including the image data transmitted from the data processing device and displayed in the image display device, and
the communication rate of the wireless communication is controlled by decimating the updating of the image data at specific intervals when the communication rate exceeds a certain rate of the effective communication rate of the wireless communication.

11. The wireless display system of claim 2,
wherein the data from said data input and output port is used for connection verification in wireless connection between the data processing device and image display device, or for user authentication in the data processing device.

12. The wireless display system of claim 2,
wherein said data input and output port are a serial communication interface.

13. The wireless display system of claim 2,
wherein said data input and output port are at least one of barcode reader, tester, digital camera, card reader, scanner, and GPS.

14. The wireless display system of claim 1,
wherein said wireless communication elements measure the communication rate of all data including the image data transmitted from the data processing device and displayed in the image display device, and
the communication rate of the wireless communication is controlled by decimating the updating of the image data at specific intervals when the communication rate exceeds a certain rate of the effective communication rate of the wireless communication.

15. The wireless display system of claim 1,
wherein said data input and output port are is a serial communication interface.

16. The wireless display system of claim 1,
wherein said data input and output port are at least one of barcode reader, tester, digital camera, card reader, scanner, and GPS.

17. The wireless display system of claim 1,
wherein the data from said data input and output port is used for connection verification in wireless connection between the data processing device and image display device, or for user authentication in the data processing device.

18. A method of communication of wireless display system having an image display device and a data processing device, said method comprising the steps of:
a) entering and producing data to and from said image display device,
b) converting data format and protocol in the wireless communication,
c) processing input and output in said data processing device virtually as if data input and output processing are done directly, and
d) if a data input or a signal indicating a state change is detected, converting the data input or the signal indicating the state change to a predetermined wireless communication data format and protocol,
wherein step a) and step b) are done at the image display device, step c) is done at the data processing device, and all communication data between said image display device and data processing device is processed at step b) and step c), and is mutually transmitted and received.

19. A computer program recording medium for executing communications of wireless display system having an image display device and a data processing device comprising the programs for:
a) entering and producing data to and from said image display device,
b) converting data format and protocol in the wireless communication,
c) processing input and output in said data processing device virtually as if data input and output processing are done directly, and
d) if a data input or a signal indicating a state change is detected, converting the data input or the signal indicating the state change to a predetermined wireless communication data format and protocol,
wherein program a) and program b) are executed at the image display device, and program c) is executed at the data processing device, and all communication data between said image display device and data processing device is transmitted and received by execution of program b) and program c).

20. A wireless display system including an image display device and a data processing device connected through wireless communication elements, the wireless display system comprising:

data input and output port for input and output of data to and from the image display device, input and output data converting elements for converting data format and protocol in the wireless communication elements, and input and output processing virtual elements for making virtual data input and output process in the data processing device as if the data input and output port are connected directly, wherein the data input and output port and input and output data converting elements are provided in the image display device, wherein the input and output processing virtual elements are provided in the data processing device, wherein all data, including input data and output data, communicated between the image display device and data processing device are mutually transmitted and received through the input and output data converting elements and input and output processing virtual elements, wherein the image display device further comprises a power saving control device, and the power saving control device sets the image display device in a first power saving mode when the image display device is not operated for a specific time, and wherein the power saving control device sets the image display device in a second power saving mode for saving more power than in the first power saving mode when the image display device is in the first power saving mode, and the data input and output port are not used for a specific time.

21. The wireless display system of claim 20, wherein the image display device further comprises display elements for displaying the image and operating elements to be operated by the user, and the power saving control device sets the display elements and operating elements in the first power saving mode.

22. The wireless display system of claim 20, wherein the wireless communication elements measure the communication rate of all data including the image data transmitted from the data processing device and displayed in the image display device, and the communication rate of the wireless communication is controlled by decimating the updating of the image data at specific intervals when the communication rate exceeds a certain rate of the effective communication rate of the wireless communication.

23. The wireless display system of claim 20, wherein the data input and output port are a serial communication interface.

24. The wireless display system of claim 20, wherein the data input and output port are at least one of barcode reader, tester, digital camera, card reader, scanner, and GPS.

25. The wireless display system of claim 20, wherein the data from the data input and output port is used for connection verification in wireless connection between the data processing device and image display device, or for user authentication in the data processing device.

26. A wireless display system including an image display device and a data processing device connected through wireless communication elements, the wireless display system comprising:

data input and output port for input and output of data to and from the image display device, input and output data converting elements for converting data format and protocol in the wireless communication elements, and input and output processing virtual elements for making virtual data input and output process in the data processing device as if the data input and output port are connected directly, wherein the data input and output port and input and output data converting elements are provided in the image display device, wherein the input and output processing virtual elements are provided in the data processing device, wherein all data, including input data and output data, communicated between the image display device and data processing device are mutually transmitted and received through the input and output data converting elements and input and output processing virtual elements, wherein said wireless communication elements measure the communication rate of all data including the image data transmitted from the data processing device and displayed in the image display device, and wherein the communication rate of the wireless communication is controlled by decimating the updating of the image data at specific intervals when the communication rate exceeds a certain rate of the effective communication rate of the wireless communication.

27. The wireless display system of claim 26, wherein the image display device further comprises a power saving control device, and the power saving control device sets the image display device in a first power saving mode when the image display device is not operated for a specific time.

28. The wireless display system of claim 27, wherein the power saving control device sets the image display device in a second power saving mode for saving more power than in the first power saving mode when the image display device is in the first power saving mode, and the data input and output port are not used for a specific time.

29. The wireless display system of claim 27, wherein the image display device further comprises display elements for displaying the image and operating elements to be operated by the user, and the power saving control device sets the display elements and operating elements in the first power saving mode.

30. The wireless display system of claim 26, wherein the data input and output port are a serial communication interface.

31. The wireless display system of claim 26, wherein the data input and output port are at least one of barcode reader, tester, digital camera, card reader, scanner, and GPS.

32. The wireless display system of claim 26, wherein the data from the data input and output port is used for connection verification in wireless connection between the data processing device and image display device, or for user authentication in the data processing device.

* * * * *